United States Patent
Lin et al.

(10) Patent No.: US 7,359,356 B2
(45) Date of Patent: Apr. 15, 2008

(54) OVERFLOW CONTROL METHOD FOR FRAME SYNCHRONIZATION OF BASE STATIONS IN WIRELESS COMMUNICATION NETWORK SYSTEM

(75) Inventors: Phone Lin, Tainan (TW); Yi-Bing Lin, Taichung (TW); Guan-Hua Tu, Yongkang (TW); Ray-Guang Cheng, Keelung (TW)

(73) Assignee: Benq Corproation, Taoyuan (TW)

( * ) Notice: Subject to any disclaimer, the term of this patent is extended or adjusted under 35 U.S.C. 154(b) by 939 days.

(21) Appl. No.: 10/648,097

(22) Filed: Aug. 26, 2003

(65) Prior Publication Data

US 2004/0043781 A1    Mar. 4, 2004

(30) Foreign Application Priority Data

Aug. 29, 2002   (TW) .................................. 91119647

(51) Int. Cl.
*H04Q 7/00*    (2006.01)
(52) U.S. Cl. ........................................ 370/332; 455/442
(58) Field of Classification Search ........ 370/229–235, 370/331, 332, 338; 455/436, 442, 443
See application file for complete search history.

(56) References Cited

U.S. PATENT DOCUMENTS 5,940,371 A * 8/1999 Mitts et al. .................. 370/236
7,170,856 B1 * 1/2007 Ho et al. ...................... 370/230
2002/0067706 A1 * 6/2002 Bautz et al. ................. 370/331
2002/0167926 A1 * 11/2002 Lee ............................. 370/338
2004/0218617 A1 * 11/2004 Sagfors ....................... 370/412

* cited by examiner

Primary Examiner—Ricky Q. Ngo
Assistant Examiner—Pao Sinkantarakorn
(74) Attorney, Agent, or Firm—Snell & Wilmer L.L.P.

(57) ABSTRACT

The present invention provides an overflow control method for frame synchronization of base stations in wireless communication network system. The wireless communication network system includes a radio network controller, a first base station, a second base station, and a mobile unit. The radio network controller transmits a plurality of data frames to the first base station and the second base station. The present invention includes the following steps. First, determine whether number of the plurality of data frames received by the second base station is larger than a judging storage capacity. Second, calculate an X and delete X of data frames from the second base station if the number is larger. The X is equal to the result of subtracting the judging storage capacity from the number. Meanwhile, detect a link quality between the mobile unit and the first base station. If the link quality is lower than a preset value, calculate an N and delete N of data frames from the second base station when N is larger than zero. The N is equal to number of data frames not yet deleted from the second base station and already received by the mobile unit.

18 Claims, 13 Drawing Sheets

OVERFLOW CONTROL METHOD FOR FRAME SYNCHRONIZATION OF BASE STATIONS IN WIRELESS COMMUNICATION NETWORK SYSTEM

CROSS REFERENCE TO RELATED APPLICATIONS

This application claims priority of Taiwan Patent Application Ser. No. 091119647 filed on Aug. 29, 2002.

FIELD OF INVENTION

The present invention relates to an overflow control method for frame synchronization of base stations in a wireless communication network system. And more particularly, the present invention relates to an overflow control method for frame synchronization of base stations in a wireless communication network system when the serving base station of a mobile unit changes.

BACKGROUND OF THE INVENTION

Mobile units have been very common communication means. Herein mobile units may be portable communication apparatuses, such as mobile phones or wireless modems. For a wireless communication system, the mobile unit transmits information through communicating with a base station. However, the coverage area of a base station is limited. Thus, a number of base stations has to be set up to achieve a coverage area large enough for the mobile unit.

The base station with which the mobile unit communicates is referred to as a serving base station. When the mobile unit is moving out of the coverage area of the serving base station, the mobile unit turns to communicating with another base station as the new serving base station. In this case, the data transfer, storage and synchronization between the mobile unit and the base stations become an issue. As the communication speed and capacity grows, methods proposed under present communication standards would not be good enough.

A method of wireless communication according to the prior art is stated below.

FIG. 1A and FIG. 1B are block diagrams showing a wireless communication network system according to the prior art. This wireless communication network system includes a radio network controller 101, a first base station 103, a second base station 105, and a mobile unit 107. The radio network controller 101 has a network link 11 with the first base station 103 and a network link 13 with the second base station 105. A first link 15 exists between the mobile unit 107 and the first base station 103. The first link 15 is a wireless link. The first base station 103 includes a first register 1031. The second base station 105 includes a second register 1051. The first register 1031 and the second register 1051 respectively have a limited storage capacity for storing data frames transmitted from the radio network controller 101 through the network links 11 and 13.

When storing the data frames transmitted from the radio network controller 101 into the first register 1031, the first base station 103 sends a first response message 111 to the radio network controller 101 through the network links 11. The first response message 111 is for telling the radio network controller 101 that the data frames have been completely received and the first register 1031 still has space for storing data frames. Then the radio network controller 101 could transmit other data frames.

Meanwhile, the first base station 103 transmits received data frames to the mobile unit 107 through the first link 15. When receiving the data frames, the mobile unit 107 sends a second response message 151 to the first base station 103 through the first link 15. The second response message 151 indicates complete receiving of the data frames.

When receiving the second response message 151, the first base station 103 deletes data frames already received by the mobile unit 107 from the first register 1031.

During the above-mentioned process, the first base station 103 has to check if overflow occurs in the first register 1031 before sending the first response message 111. If an overflow is about to occur, the first base station 103 stops sending the first response message 111 to the radio network controller 101. The radio network controller 101 would not be allowed to transmit other data frames until data frames are successfully transmitted to the mobile unit 107 and transmitted data frames are deleted from the first base station 103 to prevent the overflow from occurring. Therefore, no space for storing data frames received by the first base station 103 would not happen in the first register 1031.

A base station could be a serving base station or a neighboring base station in a universal mobile telecommunication system (UMTS), depending on its relation with the mobile unit 107. The first base station 103 is a serving base station and the second base station 105 is a neighboring base station in the foregoing wireless communication system. The mobile unit 107 communicates with the first base station 103 through the first link 15. However, once out of the coverage area of the first base station 103 owing to movement of the user, the mobile unit 107 would switch to communicating with the second base station 105. Accordingly, the radio network controller 101 would simultaneously transmit the same data frames to the first base station 103 and the second base station 105 to prevent any data frames from being lost in case the mobile unit 107 turns to the second base station 105. Therefore, both the first base station 103 and the second base station 105 receive data frames transmitted from the radio network controller 101. And the received data frames are respectively stored in the first register 1031 and the second register 1051.

Nevertheless, the data frames received by the second base station 105 would not be transmitted to the mobile unit 107 and are accumulatively stored in the second register 1051, since the second base station 105 does not have any link with the mobile unit 107 yet. Without an overflow control method, the number of data frames accumulated would larger than the limited storage capacity of the second register 1051. In this case, the data frames in the second base station 105 would be lost or disordered.

Accordingly, a method of controlling data frame overflow in the second register 1051 is needed.

A second link 17 between the mobile unit 107 and the second base station 105 would be set up, as shown in FIG. 1B, when the mobile unit 107 turns to communicating with the second base station 105 instead of the first base station 103. In addition to overflow control, how to synchronize the data frames would be an issue under this condition. Two common methods for frame synchronization in the wireless communication network system are stated below.

FIG. 2 is a schematic diagram illustrating a method for data frame synchronization in the wireless communication network system according to the prior art. According to this method, the mobile unit 107 would send a first exchange message 21 to the first base station 103 when the link quality of the first link 15 is lower than a preset value. The first exchange message 21 includes authentication data of the user and the position of the second base station 105. The first base station 103 would return a first confirmation message 23 after receiving the first exchange message 21. Then the mobile unit 107 would send a second exchange message 25 to the second base station 105. The second base station 105 would return a second confirmation message 27 to the mobile unit 107 after receiving the second exchange message 25. The second exchange message 25 includes a CRue. The CRue is equal to number of data frames already received by the mobile unit 107 through the first link 15. When receiving the second exchange message 25, the second base station 105 would calculate a CS2 equal to number of data frames stored in the second register 1051 and calculate an N by subtracting the CS2 from the CRue. N being larger than zero means there are data frames not yet deleted from the second base station 105 and already received by the mobile unit 107 in the second base station 105. In this case, N of data frames would be deleted from the second base station 105 to achieve data frame synchronization.

However, the transmission speed of the wireless link may be affected by the environment and even be much lower than the network link, so that the information transmission through the wireless link delays. Once the amount of the information to be transmitted is larger than the transmission capacity of the wireless link, the information has to be divided into several pieces and transmitted separately, and then the transmission delay due to the wireless link is even worse.

The second link 17 through which the second exchange message 25 mentioned above is transmitted is a wireless link. However, the second exchange message 25 could not be transmitted through a wireless link at a time if the amount of the CRue included in the second exchange message 25 is larger than the transmission capacity of the wireless link. And the transmission delay gets worse.

Another method for frame synchronization according to the prior art could solve the problem of transmission delay.

FIG. 3 is a schematic diagram illustrating another method for data frame synchronization in the wireless communication network system according to the prior art. The mobile unit 107 would send a first exchange message 21 to the first base station 103 when the link quality of the first link 15 is lower than a preset value, as shown in FIG. 3. However, being different from the method illustrated in FIG. 2, the first base station 103 would send a third exchange message 31 to the radio network controller 101 after receiving the first exchange message 21. The third exchange message 31 includes a CS1. The CS1 is equal to number of data frames already transmitted to the mobile unit 107 by the first base station 103. When getting the CS1 from the third exchange message 31, the radio network controller 101 would send a fourth exchange message 33 including the CS1 to the second base station 105. After receiving the fourth exchange message 33, the second base station 105 would calculate a CS2 equal to number of data frames stored in the second register 1051 and calculate an N by subtracting the CS2 from the CS1. N being larger than zero means there are data frames not yet deleted from the second base station 105 and already received by the mobile unit 107 in the second base station 105. In this case, N of data frames would be deleted from the second base station 105 to achieve data frame synchronization.

After that, to show being ready for communicating with the mobile unit 107, the second base station 105 sends a third confirmation message 35 to the radio network controller 101. The radio network controller 101 would send a fourth confirmation message 37 to the first base station 103. Then the first base station 103 would send a first confirmation message 23 to the mobile unit 107 after receiving the fourth confirmation message 37. The mobile unit 107 would send a second exchange message 25 to the second base station 105 after receiving the first confirmation message 23. The second base station 105 would return a second confirmation message 27 and begin to communicate with the mobile unit 107 after receiving the second exchange message 25.

The second base station 105 uses the CS1 from the first base station 103 instead of the CRue included in the first exchange message 21 to calculate number of data frames not yet deleted from the second base station 105 and already received by the mobile unit 107. The CS1, number of data frames transmitted by the first base station 103, should be equal to the CRue, number of data frames received by the mobile unit 107. Therefore, there is no need to divide certain information into several pieces and transmit separately.

In the above-mentioned method, the first exchange message 21, the first confirmation message 23, the second exchange message 25 and the second confirmation message 27 are sent through the first link 15 and the second link 17, which are wireless links. And the third exchange message 31, the fourth exchange message 33, the third confirmation message 35 and the fourth confirmation message 37 are sent through the network links 11 and 13. Accordingly, the messages have to be sent through the wireless link four times and through the network link four times as well in this method. However, the serving base station would change frequently if the link quality is not good, so that data frame synchronization has to be frequently performed. Therefore, there would be a lot of messages to be sent, though no transmission delay due to the wireless link, in this method.

To conclude, an overflow control method for frame synchronization in the wireless communication network system with less transmission delay and less messages to be sent is required.

SUMMARY OF THE INVENTION

One aspect of the present invention provides an overflow control method for frame synchronization in a wireless communication network system. The wireless communication network system includes a radio network controller, a first base station, a second base station, and a mobile unit. The mobile unit originally communicates with the first base station and turns to the second base station later. There is a first link between the mobile unit and the first base station. The first base station transmits received data frames to the mobile unit through the first link. The second base station includes a register for storing data frames received by the second base station. The register has a storage capacity $N_{max}$. A judging storage capacity K is set.

The method of the present invention includes the following steps. First, determine whether number of data frames received by the second base station is larger than the judging storage capacity K. Calculate an X by subtracting the judging storage capacity K from the number if the number is larger. Then delete X of data frames from the register. Meanwhile, detect a link quality of the first link. If the link quality is lower than a preset value, calculate an N equal to number of data frames not yet deleted from the second base station and already received by the mobile unit. Delete N of data frames from the register when N is larger than zero.

The advantages and spirit of the present invention may be further comprehended through the following detailed description and drawings.

DETAILED DESCRIPTION

Figure 1A:
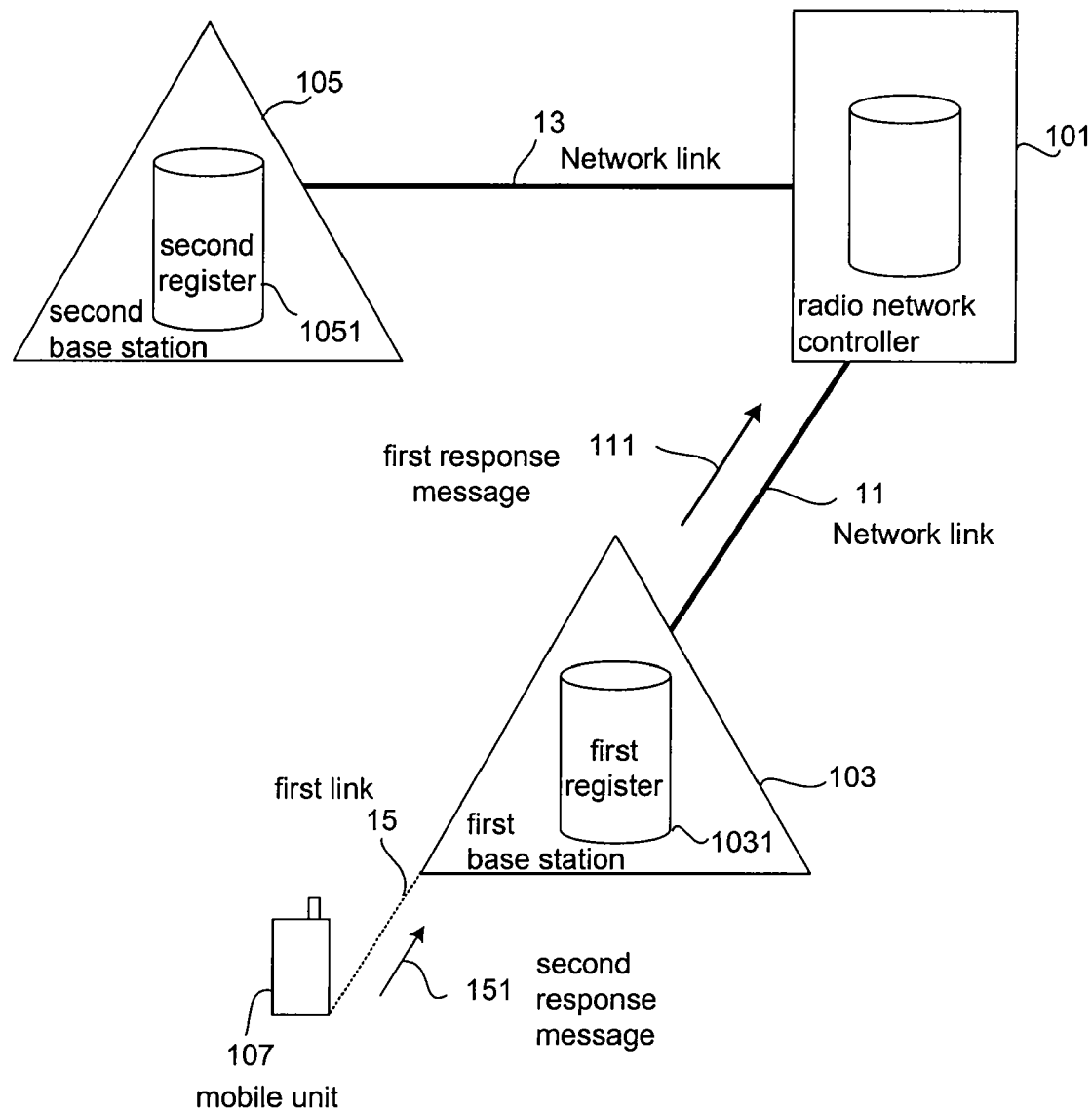
FIG. 1A and FIG. 1B are block diagrams showing a wireless communication network system according to the prior art.
Figure 1B:
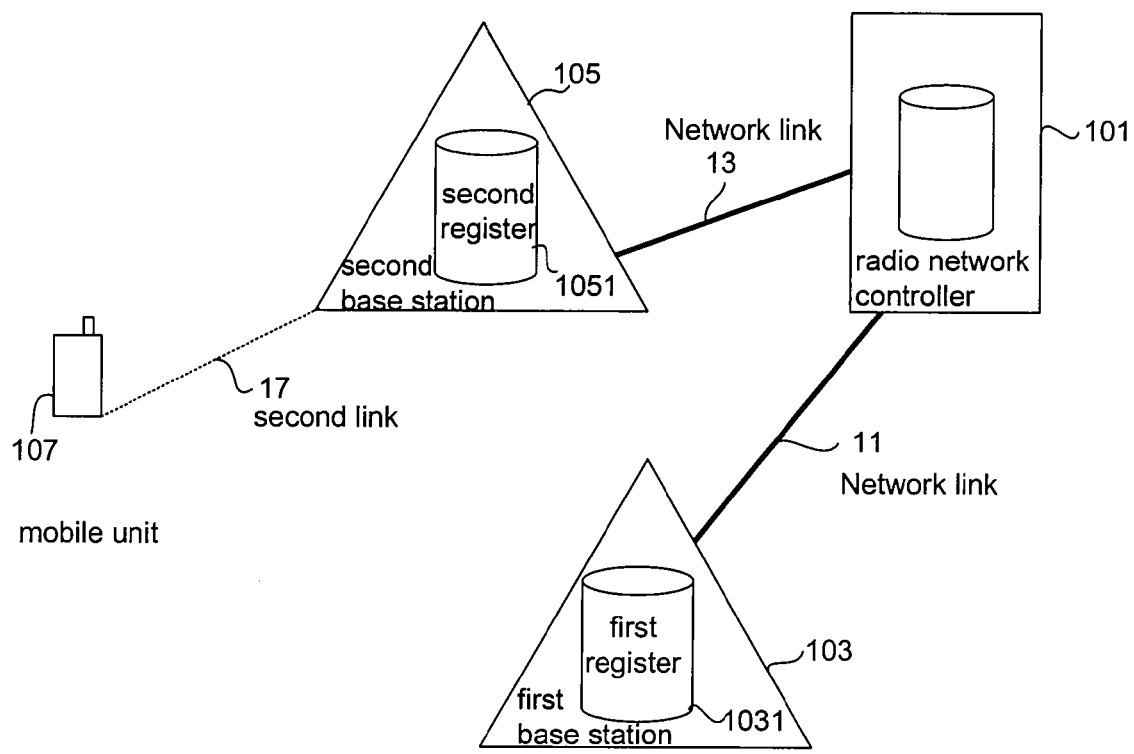
Figure 2:
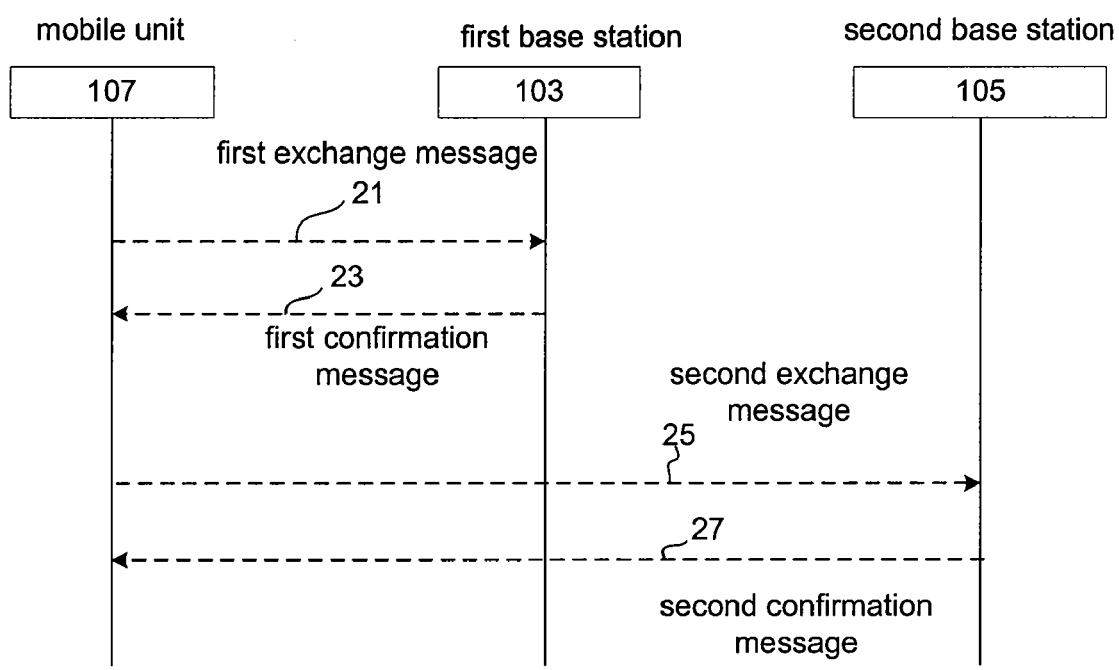
FIG. 2 is a schematic diagram illustrating a method for data frame synchronization in the wireless communication network system according to the prior art.
Figure 3:
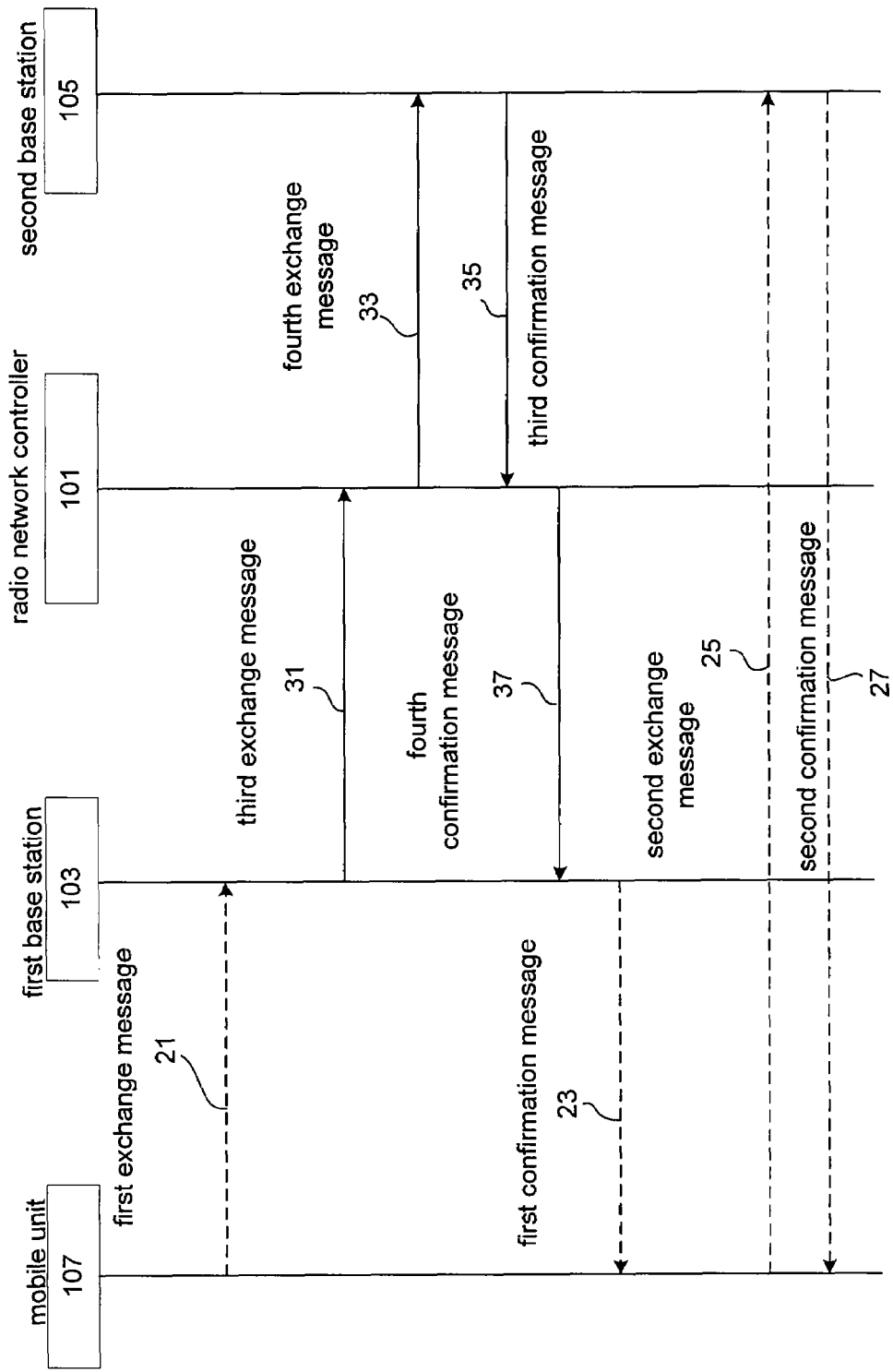
FIG. 3 is a schematic diagram illustrating another method for data frame synchronization in the wireless communication network system according to the prior art.
Figure 4A:
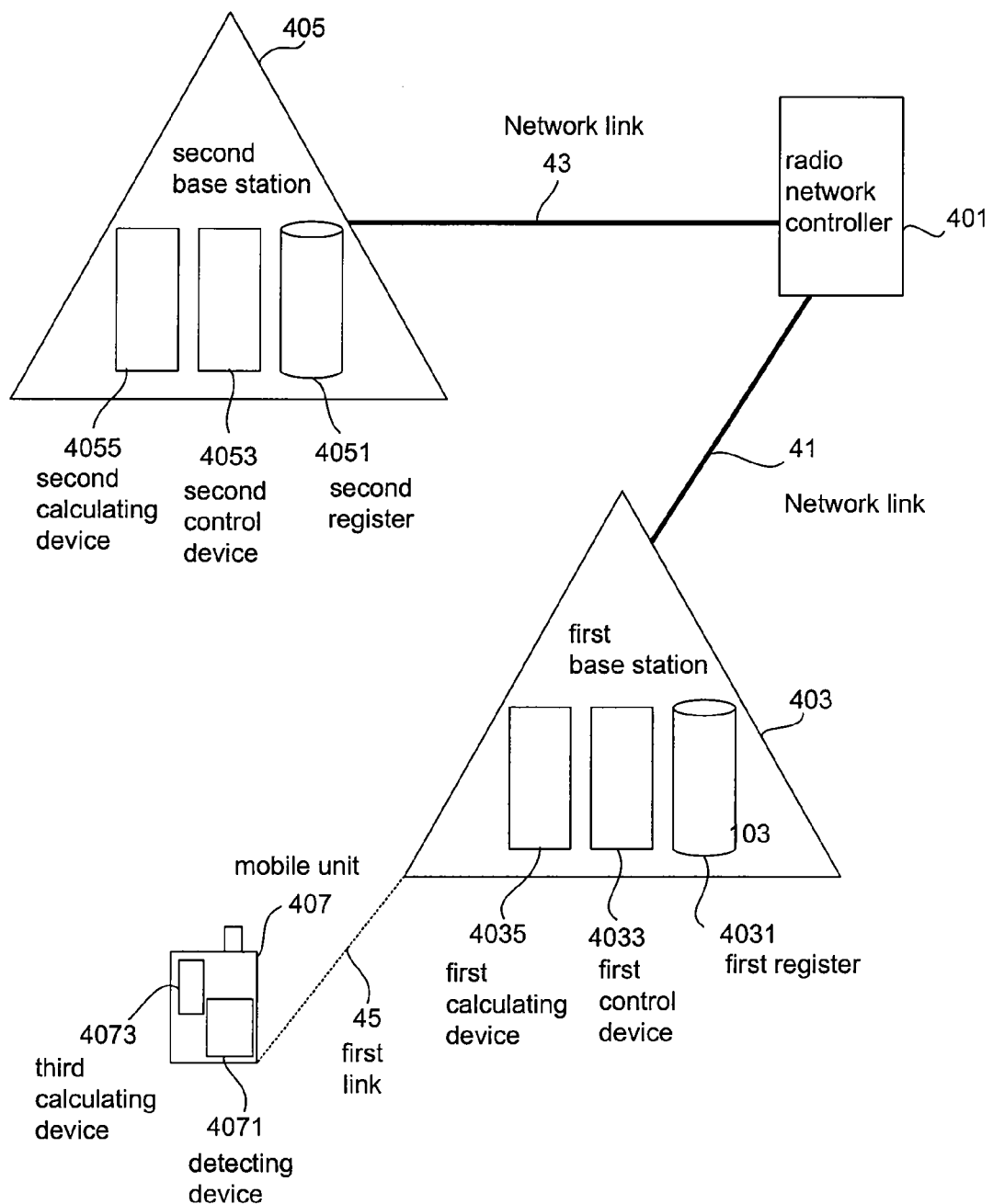
FIG. 4A and FIG. 4B are block diagrams showing a wireless communication network system according to the present invention.
Figure 4B:
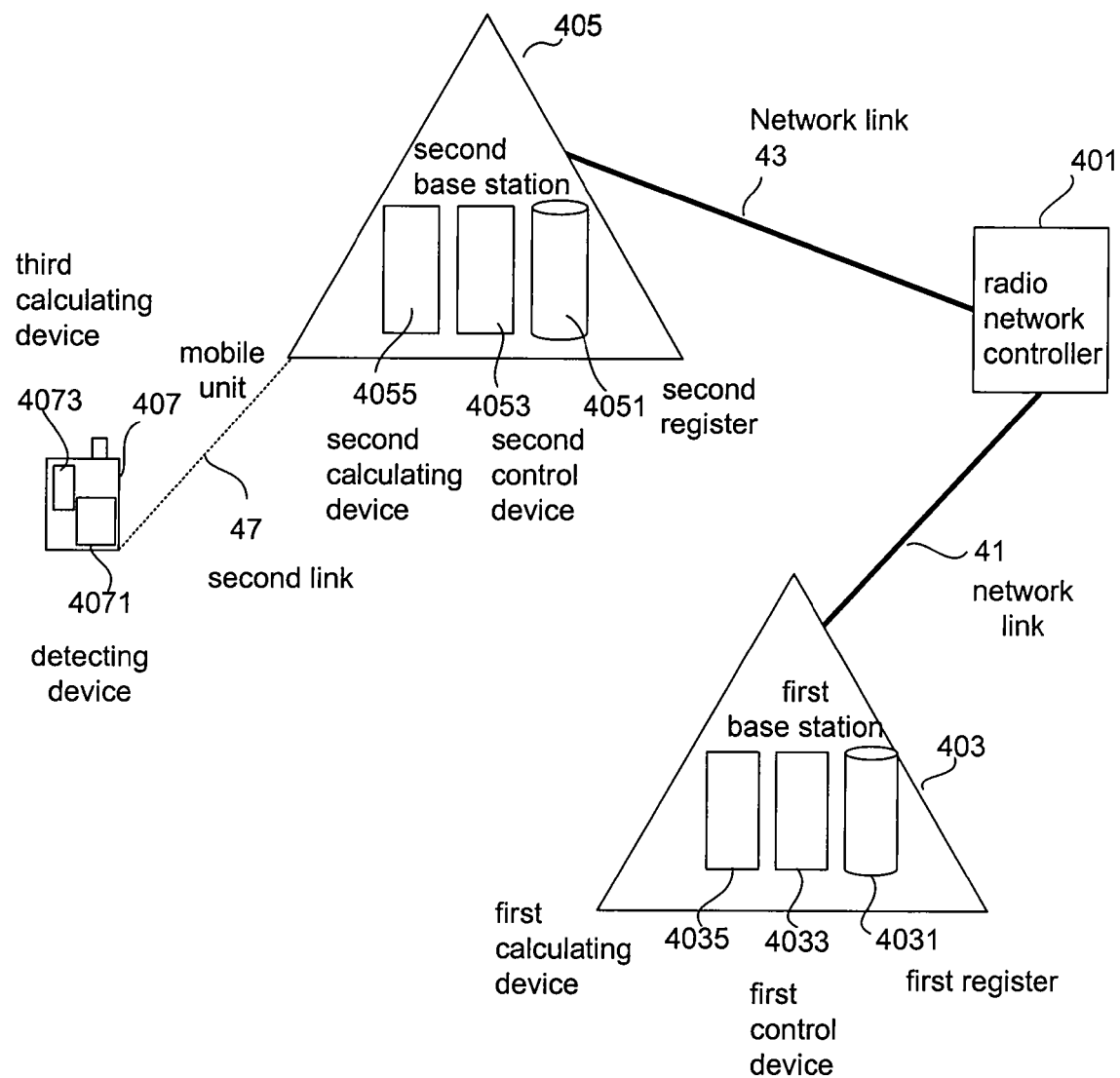

FIG. 4A and FIG. 4B are block diagrams showing a wireless communication network system according to the present invention. As shown in FIG. 4A, this wireless communication network system includes a radio network controller 401, a first base station 403, a second base station 405, and a mobile unit 407.

The second base station 405 is adjacent to the first base station 403 in this embodiment. When moving out of the coverage area of the first base station 403, the mobile unit 407 would turn to communicating with the second base station 405.

The radio network controller 401 has a network link 41 with the first base station 403 and a network link 43 with the second base station 405. The radio network controller 401 transmits a plurality of data frames to be transmitted to the mobile unit 407 to the first base station 403 and the second base station 405 through the network links 41 and 43. Here the data frames are transmitted to the first base station 403 and the second base station 405 simultaneously to prevent any data frames from being lost in case the mobile unit 407 changes its serving base station. When transmitting data frames, the radio network controller 401 takes w data frames as a unit. The w could be varied according to different communication environment and would not be limited here.

A first link 45 exists between the mobile unit 407 and the first base station 403. The first base station 403 transmits received data frames to the mobile unit 407 through the first link 45. The first link 45 is a wireless link, and its wireless transmission capacity has a maximum. The maximum means the maximum amount of information could be transmitted through the first link 45 at a time.

In this embodiment, the first base station 403 includes a first register 4031, a first control device 4033 and a first calculating device 4035. The second base station 405 includes a second register 4051, a second control device 4053 and a second calculating device 4055. The mobile unit 407 includes a detecting device 4071 and a third calculating device 4073.

The first register 4031 and the second register 4051 are respectively for storing data frames received by the first base station 403 and the second base station 405. Both the first register 4031 and the second register 4051 are assumed to have a storage capacity $N_{max}$. The judging storage capacity of the first register 4031 in this embodiment is set as K'. Here $K' \square N_{max}-2*w$. The first control device 4033 determines whether number of data frames received by the first base station 403 is larger than K'. If the number is larger than K', the first control device 4033 asks the radio network controller 401 to stop transmitting data frames. And data frames would be deleted from the first register 4031 after data frames received by the first base station 403 are successfully transmitted to the mobile unit 407 through the first link 45. Then the first control device 4033 could ask the radio network controller 401 to get back to transmit data frames as long as number of data frames in the first register 4031 is smaller than K'. Therefore, number of data frames in the first register 4031 would not be larger than K', and there is no overflow in the first base station 403.

The judging storage capacity of the second register 4051 is set as K. Here $K \square N_{max}-w$. The second control device 4053 determines whether number of data frames received by the second base station 405 is larger than K. If the number is larger than K, the second calculating device 4055 calculates an X by subtracting K from the number. Then the second control device 4053 deletes X of data frames from the second register 4051. In this embodiment, data frames first stored in the second register 4051 are first deleted; i.e., "first in first out (FIFO)". According to the above, number of data frames in the second register 4051 would not be larger than K, and there is no overflow in the second base station 405.

The second base station 405 has to keep at most w data frames additionally in case data frames are lost when the mobile unit 407 changes its serving base station. Therefore, the above-mentioned K is larger than K' by w.

Based on the above, the method of the present invention solves the problem of data frame overflow of base stations in a wireless communication network system.

The steps for frame synchronization according to exemplary embodiments of the present invention would be described below. Then both overflow control and frame synchronization of base stations in a wireless communication network system could be achieved.

Figure 5:
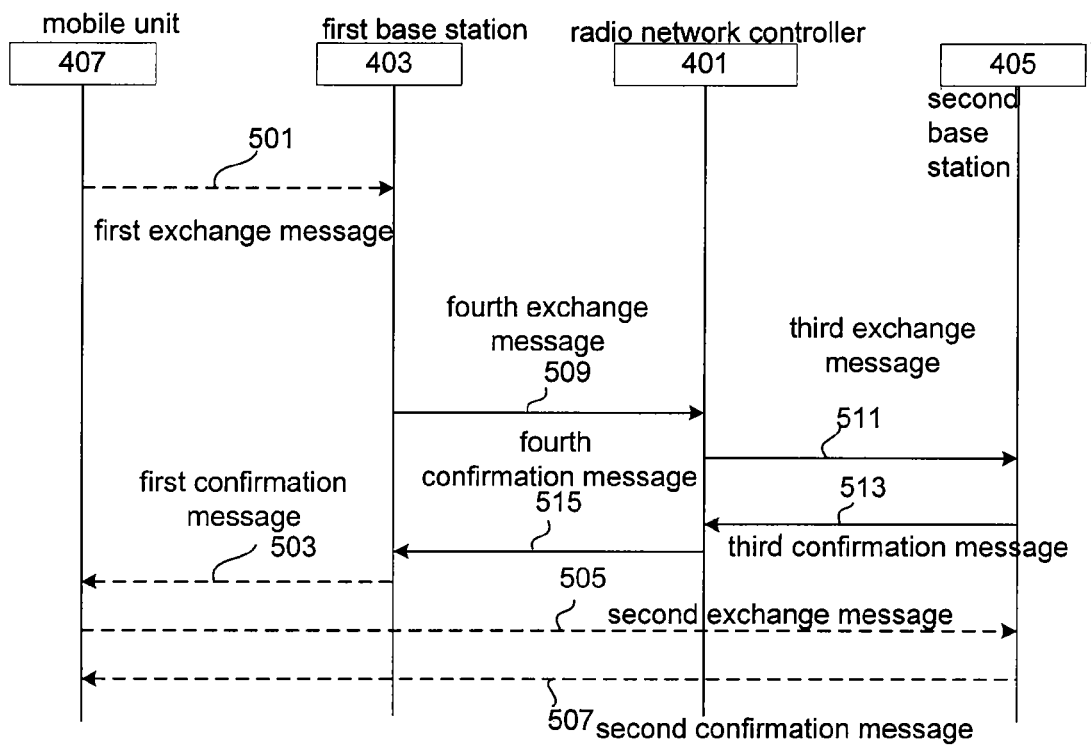
FIG. 5 is a schematic diagram illustrating a first exemplary embodiment of a wireless communication network system according to the present invention.

FIG. 5 is a schematic diagram illustrating a first exemplary embodiment of a wireless communication network system according to the present invention. When the link quality of the first link 45 is lower than a preset value, the mobile unit 407 sends a first exchange message 501 to the first base station 403 through the first link 45, as shown in FIGS. 4A, 4B and FIG. 5. The first exchange message 501 includes information related to the position of the second base station 405. After receiving the first exchange message 501, the first base station 403 sends a third exchange message 509 to the radio network controller 401 through the network link 41. The third exchange message 509 includes a CS1 calculated by the first calculating device 4035. The CS1 is equal to number of data frame already transmitted to the mobile unit 407 by the first base station 403. When getting the CS1 from the third exchange message 509, the radio network controller 401 would send a fourth exchange message 511 including the CS1 to the second base station 405.

After receiving the fourth exchange message 511, the second calculating device 4055 calculates a CS2 equal to number of data frames already deleted from the second base station 405 and calculates an N by subtracting the CS2 from the CS1. N being larger than zero means there are data frames not yet deleted from the second base station 405 and already received by the mobile unit 407 in the second base station 405. In this case, N of data frames would be deleted from the second base station 405 to achieve data frame synchronization.

After that, the second base station 405 sends a third confirmation message 513 to the radio network controller 401 through the network link 43. The radio network controller 401 then sends a fourth confirmation message 515 to the first base station 403. After receiving the fourth confirmation message 515, the first base station 403 sends a first confirmation message 503 to the mobile unit 407. After receiving the first confirmation message 503, the mobile unit 407 breaks off the first link 45 and sets up a second link 47 with the second base station 405. Then the mobile unit 407 sends a second exchange message 505 to the second base station 405 through the second link 47. After receiving the second exchange message 505, the second base station 405 returns a second confirmation message 507 through the second link 47. Hence frame synchronization is achieved.

Then, through the second link 47, the second base station 405 could transmit data frames received by the second base station 405 to the mobile unit 407. Therefore, the mobile unit 407 could keep on receiving information through the transmission path built in the wireless communication network system of the present invention.

Figure 6:
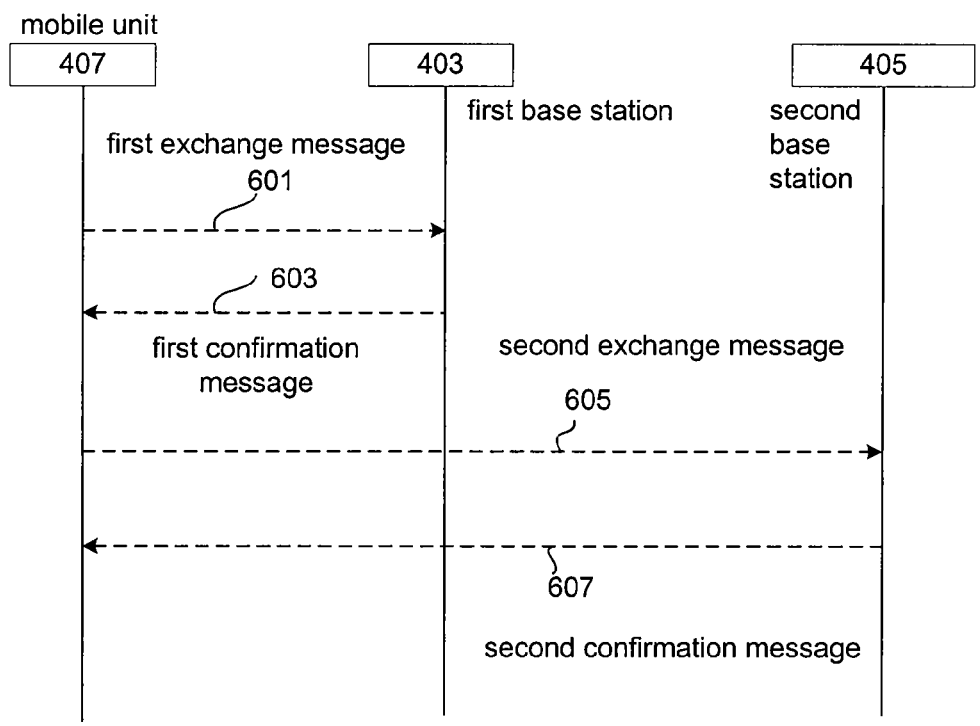
FIG. 6 is a schematic diagram illustrating a second exemplary embodiment of a wireless communication network system according to the present invention.

FIG. 6 is a schematic diagram illustrating a second exemplary embodiment of a wireless communication network system according to the present invention. When the link quality of the first link 45 is lower than a preset value, the mobile unit 407 sends a first exchange message 601 to the first base station 403 through the first link 45, as shown in FIGS. 4A, 4B and FIG. 6. The first exchange message 601 includes information related to the position of the second base station 405. After receiving the first exchange message 601, the first base station 403 returns a first confirmation message 603 to the mobile unit 407 through the first link 45. After receiving the first confirmation message 603, the mobile unit 407 breaks off the first link 45 and chooses the second base station 405 to set up a second link 47 with the second base station 405. Then the mobile unit 407 sends a second exchange message 605 to the second base station 405 through the second link 47. After receiving the second exchange message 605, the second base station 405 returns a second confirmation message 607 to the mobile unit 407 through the second link 47.

The second exchange message 605 includes a CRue calculated by the third calculating device 4073. The CRue is equal to number of data frames already received by the mobile unit 407. After receiving the second exchange message 605, the second base station 405 calculates the CS2, and calculates an N by subtracting the CS2 from the CRue. N being larger than zero means there are data frames not yet deleted from the second base station 405 and already received by the mobile unit 407 in the second base station 405. In this case, N of data frames would be deleted from the second base station 405 to achieve data frame synchronization. Hence frame synchronization is achieved.

However, the transmission to the mobile unit 407 is through a wireless link, and its wireless transmission capacity has a maximum. The maximum means the maximum amount of information could be transmitted through the wireless link at a time.

Figure 7:
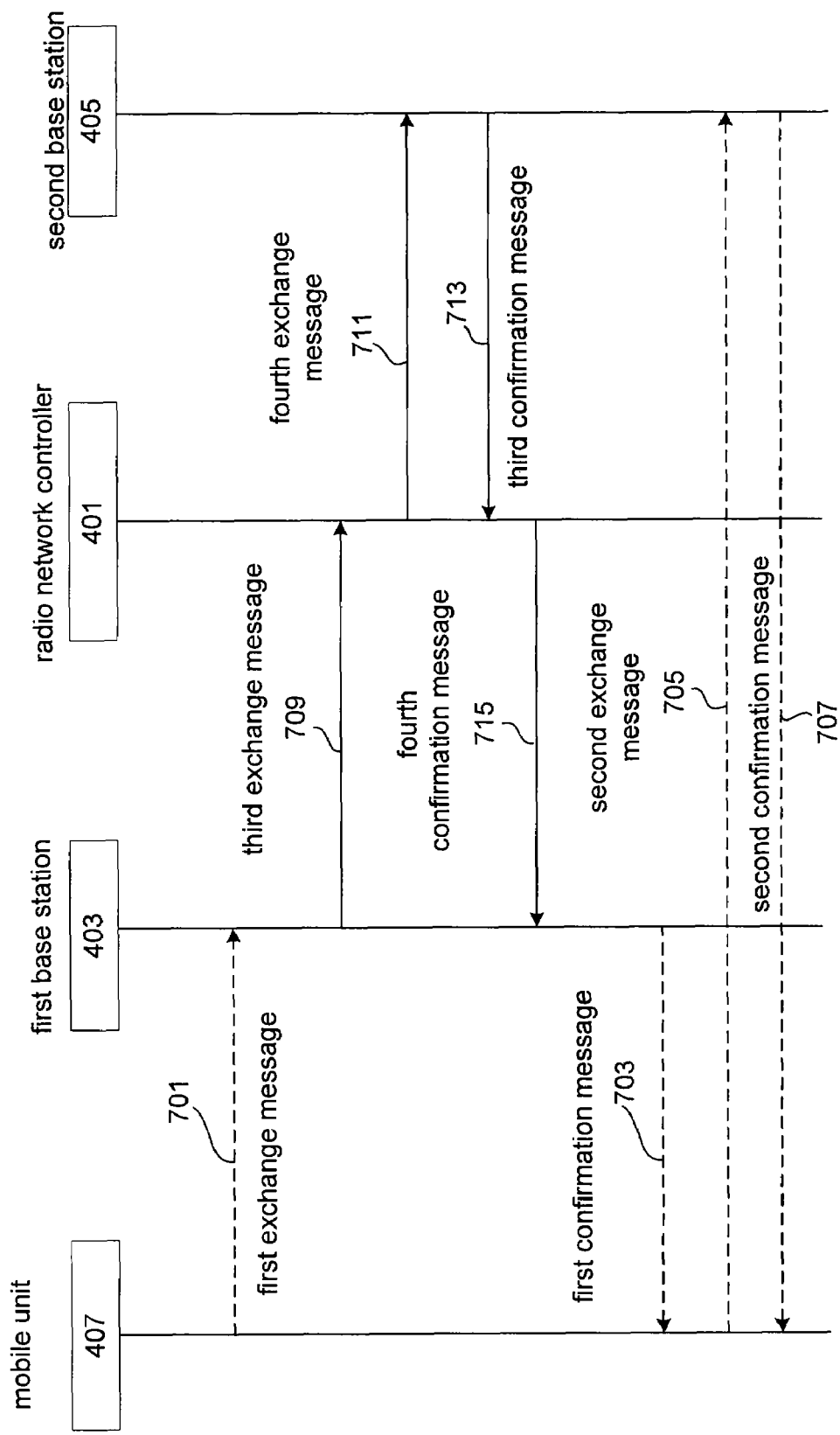
FIG. 7 is a schematic diagram illustrating a third exemplary embodiment of a wireless communication network system according to the present invention.

FIG. 7 is a schematic diagram illustrating a third exemplary embodiment of a wireless communication network system according to the present invention. When the link quality of the first link 45 is lower than a preset value, the mobile unit 407 sends a first exchange message 701 to the first base station 403 through the first link 45, as shown in FIGS. 4A, 4B and FIG. 7. The first exchange message 701 includes information related to the position of the second base station 405. After receiving the first exchange message 701, the first base station 403 determines whether the CS1 is larger than the wireless transmission capacity.

If the CS1 is not larger than the wireless transmission capacity, the first base station 403 returns a first confirmation message 703 to the mobile unit 407 through the first link 45. According to the information related to the position of the second base station 405 in the first exchange message 701, the mobile unit 407 breaks off the first link 45 and chooses the second base station 405 to set up a second link 47 with the second base station 405. Then the mobile unit 407 sends a second exchange message 705 to the second base station 405 through the second link 47. After receiving the second exchange message 705, the second base station 405 returns a second confirmation message 707 to the mobile unit 407 through the second link 47. The second exchange message 705 includes the CRue. When receiving the second exchange message 705, the second base station 405 calculates the CS2. Meanwhile, the second base station 405 calculates an N by subtracting the CS2 from the CRue. N being larger than zero means there are data frames not yet deleted from the second base station 405 and already received by the mobile unit 407 in the second base station 405. In this case, N of data frames would be deleted from the second base station 405 to achieve data frame synchronization.

On the other hand, a CS1 larger than the wireless transmission capacity means the CRue in the mobile unit 407 cannot be transmitted to the second base station 405 through the wireless link. In this case, the following steps are performed. After receiving the first exchange message 701 through the first link 45, the first base station 403 sends a third exchange message 709 to the radio network controller 401 through the network link 41. The third exchange message 709 includes the CS1. When getting the CS1 from the third exchange message 709, the radio network controller 401 sends a fourth exchange message 711 including the CS1 to the second base station 405 through the network link 43. After receiving the fourth exchange message 711, the second base station 405 calculates the CS2, and calculates an N by subtracting the CS2 from the CS1. N being larger than zero means there are data frames not yet deleted from the second base station 405 and already received by the mobile unit 407 in the second base station 405. In this case, N of data frames would be deleted from the second base station 405 to achieve data frame synchronization.

After that, the second base station 405 sends a third confirmation message 713 to the radio network controller 401 through the network link 43. Then the radio network controller 401 sends a fourth confirmation message 715 to the first base station 403 through the network link 41. After receiving the fourth confirmation message 715, the first base station 403 sends a first confirmation message 703 to the mobile unit 407 through the first link 45. After receiving the first confirmation message 703, the mobile unit 407 breaks off the first link 45 and sets up a second link 47 with the second base station 405. Then the mobile unit 407 sends a second exchange message 705 to the second base station 405 through the second link 47. After receiving the second exchange message 705, the second base station 405 returns a second confirmation message 707 through the second link 47. Hence frame synchronization is achieved.

Then, through the second link 47, the second base station 405 could transmit data frames received by the second base station 405 to the mobile unit 407. Therefore, the mobile unit 407 could keep on receiving information through the transmission path built in the wireless communication network system of the present invention.

As shown in FIG. 7, by comparing the CS1 with the wireless transmission capacity, the first base station 403 determines which steps for frame synchronization to perform. Merely four messages (701, 703, 705 and 707) sent through the wireless link are needed to achieve frame synchronization when the CS1 is not larger than the wireless transmission capacity. Only when the CS1 is larger than the wireless transmission capacity that four messages (701, 703, 705 and 707) sent through the wireless link and four messages (709, 711, 713 and 715) sent through the network link are needed to achieve frame synchronization. Therefore, the amount of messages to be sent could be less, and the problem of transmission delay during frame synchronization could be solved.

Figure 8:
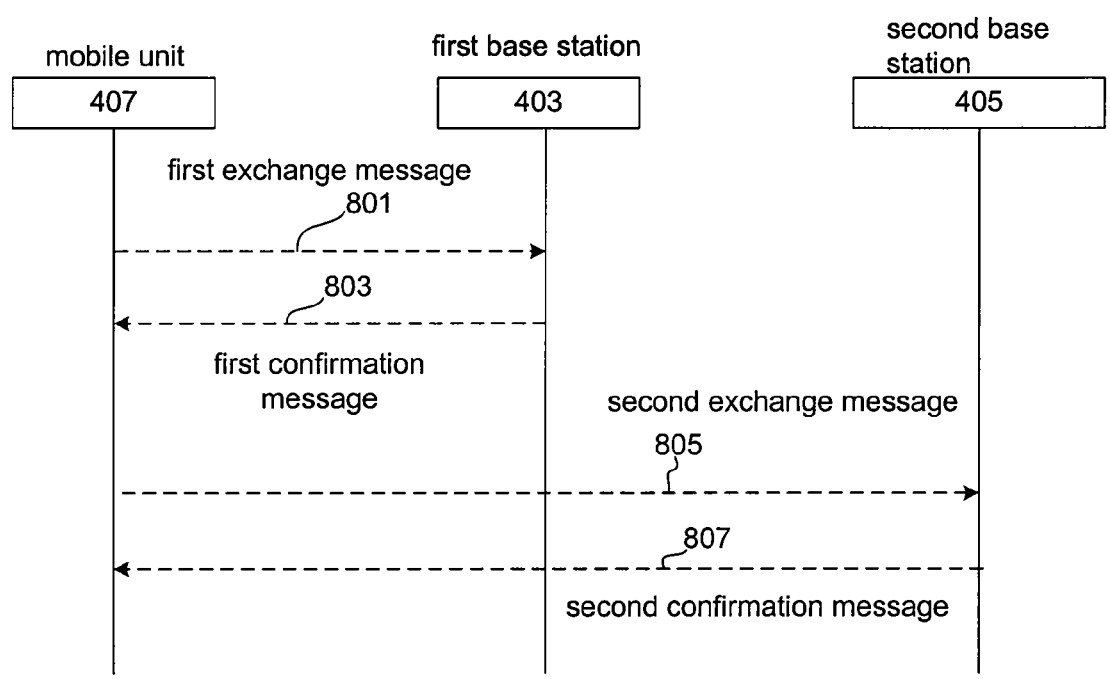
FIG. 8 is a schematic diagram illustrating a fourth exemplary embodiment of a wireless communication network system according to the present invention.

FIG. 8 is a schematic diagram illustrating a fourth exemplary embodiment of a wireless communication network system according to the present invention. When the link quality of the first link 45 is lower than a preset value, the mobile unit 407 sends a first exchange message 801 to the first base station 403 through the first link 45, as shown in FIGS. 4A, 4B and FIG. 8. The first exchange message 801 includes information related to the position of the second base station 405. After receiving the first exchange message 801, the first base station 403 determines whether the CS1 is larger than zero. If the CS1 is larger than zero, the first base station 403 sends a first confirmation message 803 to the mobile unit 407 through the first link 45. Then the mobile unit 407 breaks off the first link 45 and chooses the second base station 405 to set up a second link 47 with the second base station 405. Then the mobile unit 407 sends a second exchange message 805 to the second base station 405 through the second link 47. After receiving the second exchange message 805, the second base station 405 returns a second confirmation message 807 to the mobile unit 407 through the second link 47.

Here the second exchange message 805 includes a CRue*. The CRue* is equal to a remainder resulting from dividing the CRue by the wireless transmission capacity. When receiving the second exchange message 805, the second base station 405 calculates the CS2* equal to a remainder resulting from dividing the CS2 by the wireless transmission capacity and calculates an N by subtracting the CS2* from the CRue*. N being larger than zero means there are data frames not yet deleted from the second base station 405 and already received by the mobile unit 407 in the second base station 405. In this case, N of data frames would be deleted from the second base station 405 to achieve data frame synchronization.

According to the above, the calculating way adopted in the fourth exemplary embodiment could help to perform transmission of any amount of data frames without additional messages to be sent through the wireless link. Besides, here $K'=N_{max}-2*w$.

The steps of the overflow control method for frame synchronization according to the exemplary embodiments mentioned above are stated below.

Figure 9:
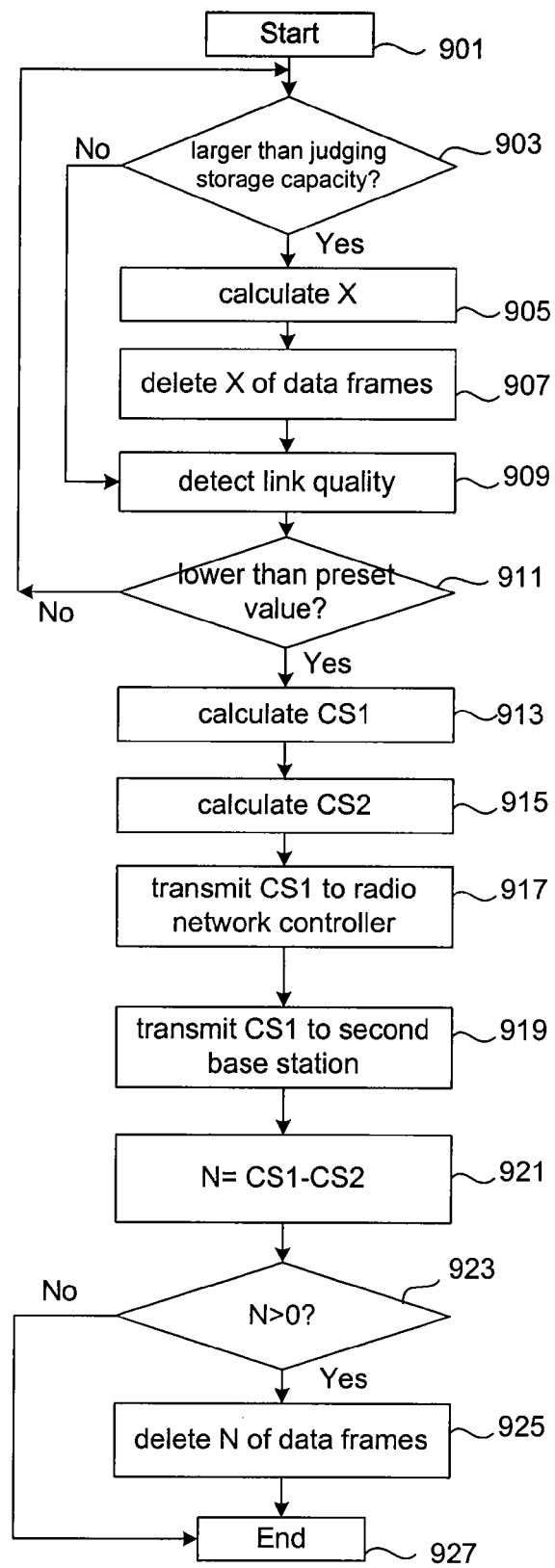
FIG. 9 is a flow chart showing a first exemplary embodiment of an overflow control method for frame synchronization according to the present invention.

FIG. 9 is a flow chart showing a first exemplary embodiment of an overflow control method for frame synchronization according to the present invention. The first exemplary embodiment includes steps 901 to 927.

First, determine whether number of data frames received by the second base station is larger than the judging storage capacity (step 903).

If the number is larger than the judging storage capacity, calculate an X by subtracting the judging storage capacity from the number (step 905).

Delete X of data frames from the register (step 907). Hence number of data frames would not be larger than the storage capacity of the register. And the problem of overflow due to the limited storage capacity of the register can be solved. The following description is about how to achieve frame synchronization in this embodiment.

Detect a link quality of the first link (step 909). Determine whether the link quality is lower than a preset value (step 911). A link quality lower than the preset value indicates the first link is not capable of transmitting data frames between the first base station and the mobile unit.

In this case, calculate a CS1 equal to number of data frames already transmitted by the first base station to the mobile unit (step 913). Then calculate a CS2 equal to number of data frames already deleted from the second base station (step 915).

Then transmit the CS1 from the first base station to the radio network controller (step 917). Transmit the CS1 to the second base station after the radio network controller receives the CS1 (step 919).

When the second base station receives the CS1, calculate an N by subtracting the CS2 from the CS1 (step 921). Determine whether the N is larger than zero (step 923).

If the N is larger than zero, delete N of data frames first stored from the register (step 925).

Deleting X of data frames in the step 907 and deleting N of data frames in step 925 are executed according to the sequence in which the data frames are stored. In the step 925, breaking off the first link and choosing the second base station to set up a second link between the mobile unit and the second base station would be performed as well.

The above is the steps of the first exemplary embodiment of the present invention. Both overflow control and frame synchronization could be achieved by this embodiment.

Figure 10:
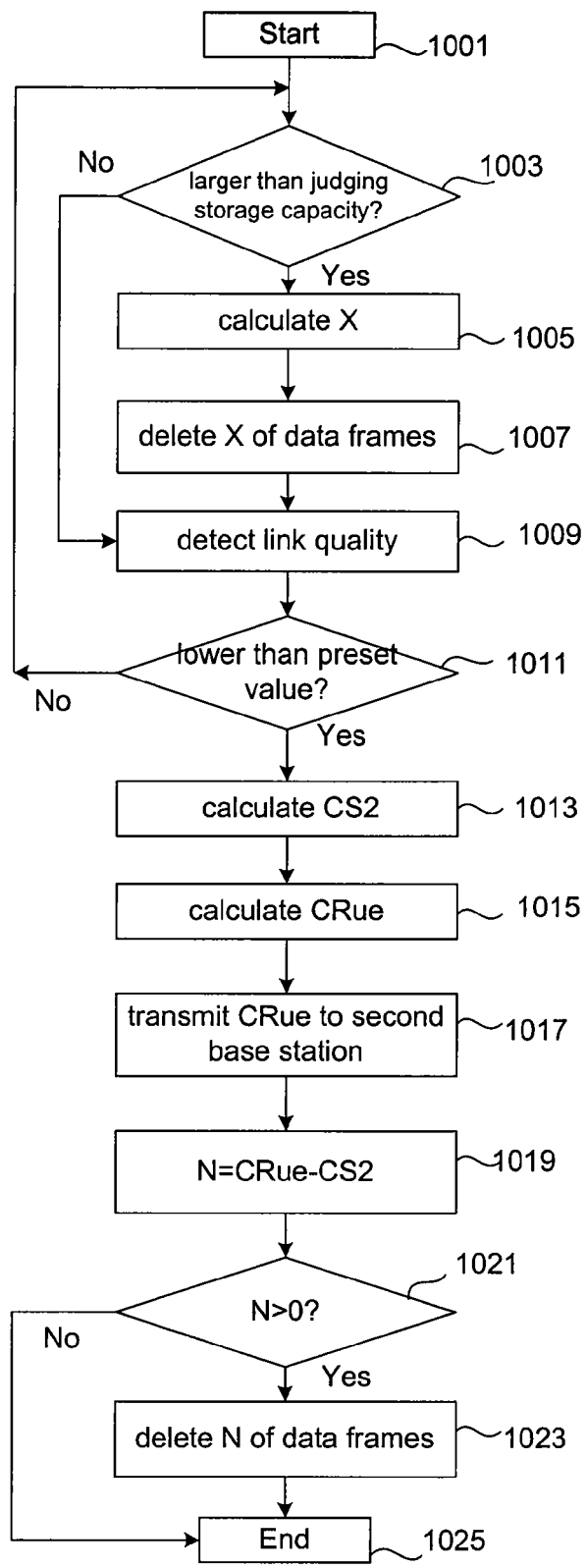
FIG. 10 is a flow chart showing a second exemplary embodiment of an overflow control method for frame synchronization according to the present invention.

FIG. 10 is a flow chart showing a second exemplary embodiment of an overflow control method for frame synchronization according to the present invention. The second embodiment includes steps 1001 to 1025. The steps 1001 to 1011 are the same as the steps 901 to 911 of the first embodiment and are not repeatedly described herein.

The difference between the second and the first exemplary embodiments lies in the steps 1013 to 1019. If the link quality is lower than a preset value, calculate a CS2 equal to number of data frames already deleted from the second base station (step 1013). Then calculate a CRue equal to number of data frames already received by the mobile unit (step 1015).

Next, transmit the CRue from the mobile unit to the second base station (step 1017). Calculate an N by subtracting the CS2 from the CRue (step 1019).

After that, determine whether the N is larger than zero (step 1021). If the N is larger than zero, delete N of data frames stored from the register (step 1023). Deleting X of data frames and deleting N of data frames are executed according to the sequence in which the data frames are stored. In the step 1023, breaking off the first link and choosing the second base station to set up a second link between the mobile unit and the second base station would be performed as well.

The above describes the steps of the second exemplary embodiment of the present invention. Both overflow control and frame synchronization could be achieved by this embodiment.

Figure 11:
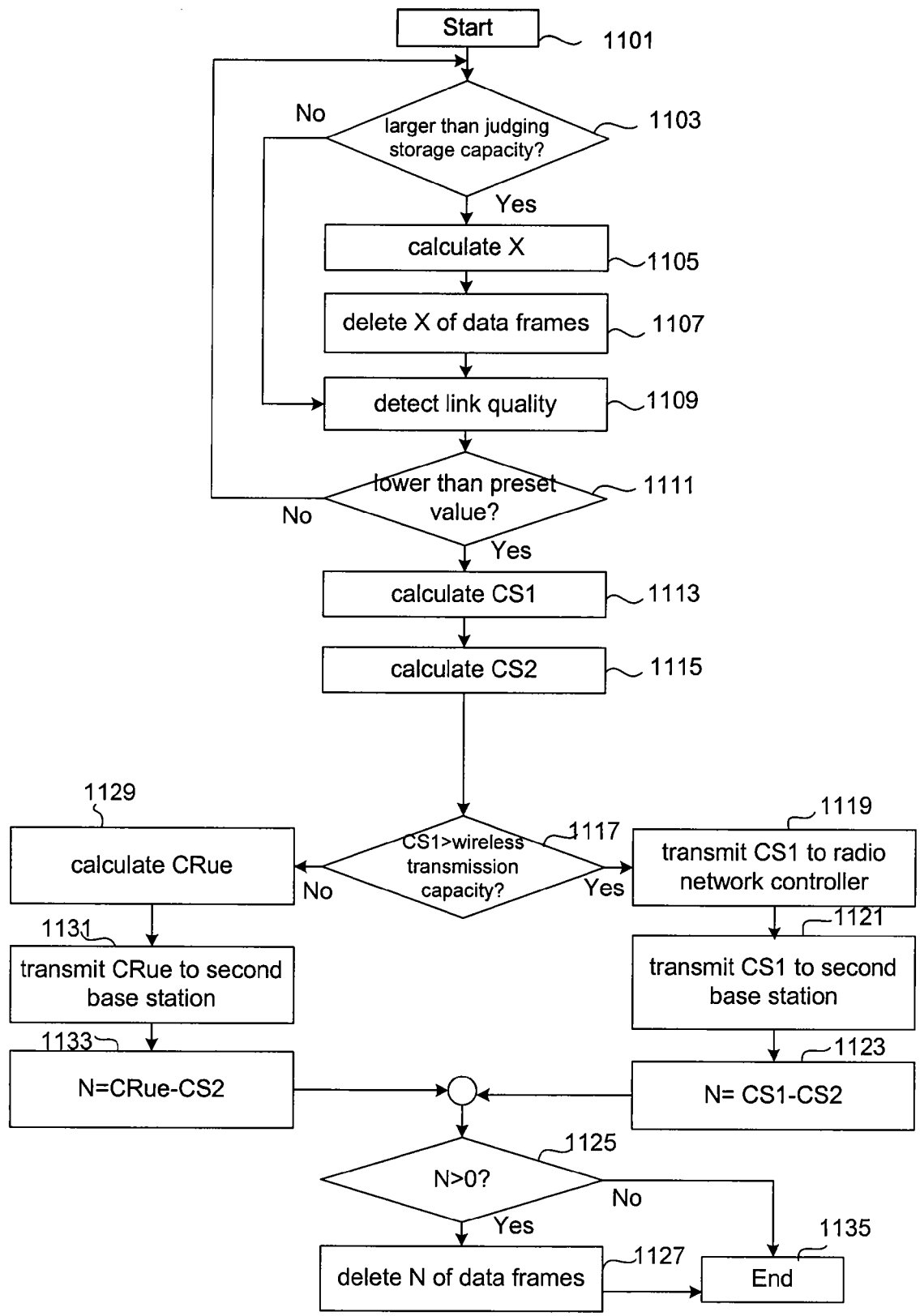
FIG. 11 is a flow chart showing a third exemplary embodiment of an overflow control method for frame synchronization according to the present invention.

FIG. 11 is a flow chart showing a third exemplary embodiment of an overflow control method for frame synchronization according to the present invention. The third embodiment includes steps 1101 to 1135. The steps 1101 to 1115 are the same as the steps 901 to 915 of the first embodiment and are not repeatedly described herein.

After the step 1115, determine whether the CS1 is larger than the wireless transmission capacity of the wireless link (step 1117). This step is for deciding between two ways for frame synchronization. If the CS1 is larger than the wireless transmission capacity, proceed to step 1119. If the CS1 is not larger than the wireless transmission capacity, proceed to step 1129.

If the CS1 is larger than the wireless transmission capacity, transmit the CS1 to the radio network controller (step 1119). Transmit the CS1 to the second base station after the radio network controller receives the CS1 (step 1121). Calculate an N by subtracting the CS2 from the CS1 (step 1123).

If the CS1 is not larger than the wireless transmission capacity, calculate a CRue equal to number of data frames already received by the mobile unit (step 1129). Transmit the CRue from the mobile unit to the second base station (step 1131). Calculate an N by subtracting the CS2 from the CRue (step 1133).

After that, determine whether the N is larger than zero (step 1125). If the N is larger than zero, delete N of data frames stored from the register (step 1127).

In the step 1127, breaking off the first link and choosing the second base station to set up a second link between the mobile unit and the second base station would be performed as well.

The above describes the steps of the third exemplary embodiment of the present invention. It should be noted that, in step 1117, which way to perform frame synchronization is decided by comparing the CS1 and the wireless transmission capacity. In addition to successfully controlling overflow, the above-mentioned method has advantages of the two methods for frame synchronization according to the prior art without the disadvantages of them.

Figure 12:
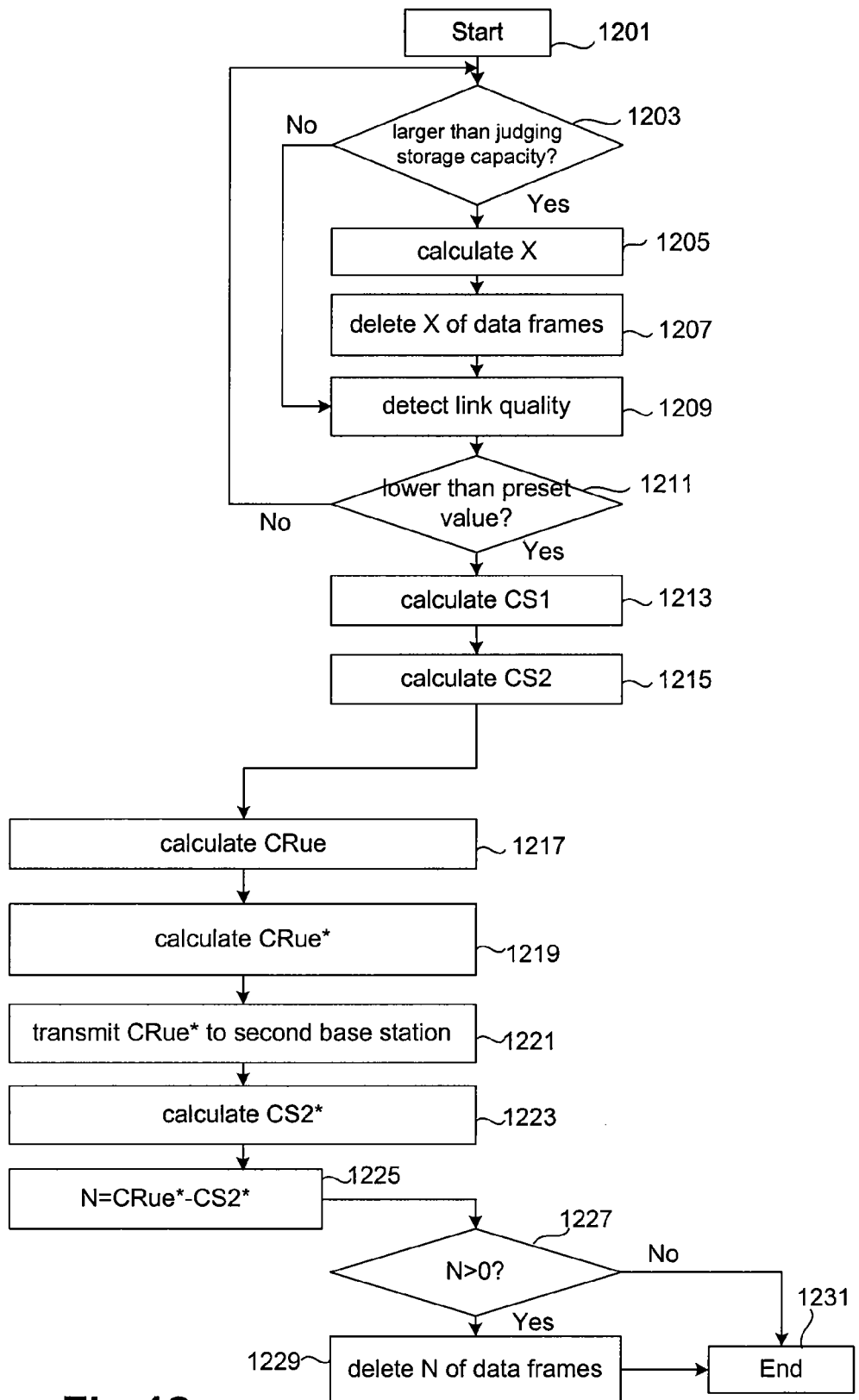
FIG. 12 is a flow chart showing a fourth exemplary embodiment of an overflow control method for frame synchronization according to the present invention.

FIG. 12 is a flow chart showing a fourth exemplary embodiment of an overflow control method for frame synchronization according to the present invention. The fourth embodiment includes steps 1201 to 1231. The steps 1201 to 1215 are the same as the steps 901 to 915 of the first embodiment and are not repeatedly described herein.

After the step 1215, calculate a CRue equal to number of data frames already received by the mobile unit (step 1217). Calculate a CRue* equal to a remainder resulting from dividing the CRue by the wireless transmission capacity (step 1219). Transmit the CRue* from the mobile unit to the second base station (step 1221). Calculate a CS2* equal to a remainder resulting from dividing the CS2 by the wireless transmission capacity (step 1223). Calculate an N by subtracting the CS2* from the CRue* (step 1225).

After that, determine whether the N is larger than zero (step 1227). If the N is larger than zero, delete N of data frames stored from the register (step 1229).

Deleting X of data frames in step 1207 and deleting N of data frames in step 1229 are executed according to the sequence in which the data frames are stored.

In the step 1229, breaking off the first link and choosing the second base station to set up a second link between the mobile unit and the second base station would be performed as well.

The above describes the steps of the fourth exemplary embodiment according to the overflow control method for frame synchronization of the present invention. The fourth embodiment does not need a step like the step 1117 of the third embodiment. The calculating way adopted in the fourth exemplary embodiment could help to perform transmission of any amount of data frames without additional messages to be sent through the wireless link as well as over flow control.

While this invention has been described with reference to the illustrative embodiments, these descriptions should not be construed in a limiting sense. Various modifications of the illustrative embodiments, as well as other embodiments of the invention, will be apparent upon reference to these descriptions. It is therefore contemplated that the appended claims will cover any such modifications or embodiments as falling within the true scope of the invention and its legal equivalents.

The invention claimed is:

1. An overflow control method for frame synchronization in a wireless communication network system, said wireless communication network system including a radio network controller, a first base station, a second base station, and a mobile unit, wherein said radio network controller transmits a plurality of data frames to said first base station and said second base station, a first link exists between said mobile unit and said first base station, said first base station transmits received data frames to said mobile unit through said first link, said second base station includes a register for storing received data frames, said register has a storage capacity $N_{max}$, said overflow control method comprising:
   (a) setting a judging storage capacity for said register smaller than said storage capacity $N_{max}$;
   (a') determining whether a number of said plurality of data frames received by said second base station is larger than said judging storage capacity;
   (b) if said number of said plurality of data frames is larger than said judging storage capacity, calculating an X by subtracting said judging storage capacity from said number of said plurality of data frames;
   (c) deleting X of data frames from said register;
   (d) detecting a link quality of said first link;
   (e) determining whether said link quality is lower than a preset value;
   (f) if said link quality is lower than said preset value, calculating a CS1 equal to a number of data frames already transmitted by said first base station to said mobile unit;
   (g) calculating a CS2 equal to a number of data frames already deleted from said second base station;
   (h) transmitting said CS1 to said radio network controller;
   (i) transmitting said CS1 to said second base station after said CS1 is received by said radio network controller; and (j) calculating an N by subtracting said CS2 from said CS1.

2. The overflow control method of claim 1, further comprising:
(p) determining whether said N is larger than zero; and
(q) if said N is larger than zero, deleting N of data frames from said register.

3. The overflow control method of claim 2, wherein data frames are stored in said register in a sequence, said steps (c) and (q) are executed according to said sequence.

4. The overflow control method of claim 2, further comprising:
breaking off said first link, and choosing said second base station to set up a second link between said mobile unit and said second base station.

5. A wireless communication system for performing the overflow control method of claim 1.

6. The overflow control method of claim 1, wherein said judging storage capacity is set as K, wherein $K \leq N_{max} - w$, w is the number of data frames said radio network controller taken as a unit.

7. An overflow control method for frame synchronization in a wireless communication network system, said wireless communication network system including a radio network controller, a first base station, a second base station, and a mobile unit, wherein said radio network controller transmits a plurality of data frames to said first base station and said second base station, a first link exists between said mobile unit and said first base station, said fast base station transmits received data frames to said mobile unit through said first link, said second base station includes a register for storing received data frames, said register has a storage capacity $N_{max}$, said overflow control method comprising:
(a) setting a judging storage capacity for said register smaller than said storage capacity $N_{max}$;
(a') determining whether a number of said plurality of data frames received by said second base station is larger than said judging storage capacity;
(b) is said number of said plurality of data frames is larger than said judging storage capacity, calculating an X by subtracting said judging storage capacity from said number of said plurality of data frames;
(c) deleting X of data frames from said register;
(d) detecting a link quality of said first link;
(e) determining whether said link quality is lower than a preset value;
(k) if said link quality is lower than said preset value, calculating a CS2 equal to a number of data frames already deleted from said second base station;
(l) calculating a CRue equal to a number of data frames already received by said mobile unit;
(m) transmitting said CRue to said second base station; and
(n) calculating an N by subtracting said CS2 from said CRue.

8. An overflow control method for frame synchronization in a wireless communication network system, said wireless communication network system including a radio network controller, a first base station, a second base station, and a mobile unit, wherein said radio network controller transmits a plurality of data frames to said first base station and said second base station, a first link having a wireless transmission capacity exists between said mobile unit and said first base station, said first base station transmits received data frames to said mobile unit through said first link, said second base station includes a register for storing received data frames, said register has a storage capacity $N_{max}$, said overflow control method comprising:
(a) setting a judging storage capacity for said register smaller than said storage capacity $N_{max}$;
(a') determining whether a number of said plurality of data frames received by said second base station is larger than said judging storage capacity;
(b) if said number of said plurality of data frames is larger than said number of said calculating an X by subtracting said judging storage capacity from said number of said plurality of data frames;
(c) deleting X of data frames from said register;
(d) detecting a link quality of said first link;
(e) determining whether said link quality is lower than a preset value;
(o) if said link quality is lower than said preset value, calculating an N equal to a number of data frames not yet deleted from said second base station and already received by said mobile unit, comprising:
(oa) calculating a CS1 equal to a number of data frames already transmitted by said first base station to said mobile unit;
(ob) calculating a CS2 equal to a number of data frames already deleted from said second base station; and
(oc) determining whether said CS1 is larger than said wireless transmission capacity.

9. The overflow control method of claim 8, said step (o) further comprising:
(od) if said CS1 is larger than said wireless transmission capacity, transmitting said CS1 to said radio network controller;
(oe) transmitting said CS1 to said second base station after said CS1 is received by said radio network controller; and
(of) calculating an N by subtracting said CS2 from said CS1.

10. The overflow control method of claim 8, said step (o) further comprising:
(og) if said CS1 is not larger than said wireless transmission capacity, calculating a CRue equal to a number of data frames already received by said mobile unit;
(oh) transmitting said CRue to said second base station; and
(oi) calculating an N by subtracting said CS2 from said CRue.

11. An overflow control method for frame synchronization in a wireless communication network system, said wireless communication network system including a radio network controller, a first base station, a second base station, and a mobile unit, wherein said radio network controller transmits a plurality of data frames to said first base station and said second base station, a first link having a wireless transmission capacity exists between said mobile unit and said first base station, said first base station transmits received data frames to said mobile unit through said first link, said second base station includes a register for storing received data frames, said register has a storage capacity $N_{max}$, said overflow control method comprising:
(a) setting a judging storage capacity for said register smaller than said storage capacity $N_{max}$;
(a') determining whether a number of said plurality of data frames received by said second base station is larger than said judging storage capacity;
(b) if said number of said plurality of data frames is larger than said judging storage capacity, calculating an X by subtracting said judging storage capacity from said number of said plurality of data frames;

(c) deleting X of data frames from said register;
(d) detecting a link quality of said first link;
(e) determining whether said link quality is lower than a preset value;
(o) if said link quality is lower than said preset value, calculating an N equal to a number of data frames not yet deleted from said second base station and already received by said mobile unit, comprising:
  (oj) calculating a CRue equal to a number of data frames already received by said mobile unit;
  (ok) calculating a CRue* equal to a remainder resulting from dividing said CRue by said wireless transmission capacity;
  (ol) transmitting said CRue* to said second base station;
  (om) calculating a CS2* equal to a remainder resulting from dividing said CS2 by said wireless transmission capacity; and
  (on) calculating an N by subtracting said CS2* from said CRue*.

12. An overflow control method for frame synchronization in a wireless communication network system, said wireless communication network system including a radio network controller, a first base station, a second base station, and a mobile unit, wherein said radio network controller transmits a plurality of data frames to said first base station and said second base station, a first link exists between said mobile unit and said first base station, said first base station transmits received data frames to said mobile unit through said first link, said second base station includes a register for storing received data frames, said register has a storage capacity $N_{max}$, said overflow control method comprising:
  (a) setting a judging storage capacity for said register smaller than said storage capacity $N_{max}$;
    (a') determining whether a number of said plurality of data frames received by said second base station is larger than said judging storage capacity;
  (b) if said number of said plurality of data frames is larger than said judging storage capacity, calculating an X by subtracting said judging storage capacity from said number of said plurality of data frames;
  (c) deleting X of data frames from said register;
  (d) detecting a link quality of said first link;
  (e) determining whether said link quality is lower than a preset value;
  (f) if said link quality is lower than said preset value, calculating an N equal to a number of data frames not yet deleted from said second base station and already received by said mobile unit, comprising:
    (fa) calculating a CS1 equal to a number of data frames already transmitted by said first base station to said mobile unit;
    (fb) calculating a CRue equal to a number of data frames already received by said mobile unit;
    (fc) calculating a CRue* equal to a remainder resulting from dividing said CRue by said wireless transmission capacity;
    (fd) transmitting said CRue* to said second base station;
    (fe) calculating a CS2 equal to a number of data frames already deleted from said second base station;
    (ff) calculating a CS2* equal to a remainder resulting from dividing said CS2 by said wireless transmission capacity; and
    (fg) calculating an N by subtracting said CS2* from said CRue*:
  (g) determining whether said N is larger than zero; and
  (h) if said N is larger than zero, deleting N of data frames from said register.

13. The overflow control method of claim 12, wherein said data frames are stored in said register in a sequence, said steps (c) and (h) are executed according to said sequence.

14. The overflow control method of claim 12, further comprising:
  breaking off said first link, and choosing said second base station to set up a second link between said mobile unit and said second base station.

15. A wireless communication system for performing the overflow control method of claim 12.

16. The overflow control method of claim 12, wherein said judging storage capacity is set as K, wherein $K \leq N_{max} - w$, w is the number of data frames said radio network controller taken as a unit.

17. An overflow control method for frame synchronization in a wireless communication network system said wireless communication network system including a radio network controller, a first base station, a second base station, and a mobile unit, wherein said radio network controller transmits a plurality of data frames to said first base station and said second base station, said first base station transmits received data frames to said mobile unit through a first link, said overflow control method comprising:
  (a) detecting a link quality of said first link, if said link quality is lower than a preset value, calculating a CS1 equal to a number of data frames already transmitted by said first base station to said mobile unit;
  (b) calculating a CS2 equal to a number of data frames already deleted from said second base station;
  (c) transmitting said CS1 to said second base station through said radio network controller;
  (d) calculating an N by subtracting said CS2 from said CS1; and
  (e) deleting N of data frames from said second base station if said N is larger than zero.

18. An overflow control method for frame synchronization in a wireless communication network system, said wireless communication network system including a radio network controller, a first base station, a second base station, and a mobile unit, wherein said radio network controller transmits a plurality of data frames to said first base station and said second base station, said first base station transmits received data frames to said mobile unit through a first link, said overflow control method comprising:
  (a) detecting a link quality of said first link, if said link quality is lower than a preset value, calculating a CRue equal to a number of data frames already received by said mobile unit;
  (b) calculating a CS2 equal to a number of data frames already deleted from said second base station;
  (c) transmitting said CRue to said second base station;
  (d) calculating an N by subtracting said CS2 from said CRue; and
  (e) deleting N of data frames from said second base station if said N is larger than zero.

* * * * *